US012699041B2

(12) United States Patent
White

(10) Patent No.: US 12,699,041 B2
(45) Date of Patent: Aug. 4, 2026

(54) APPARATUS FOR VARIABLE TEMPERATURE INFRARED SPECTROSCOPY WITH A BUTTON SAMPLE HOLDER

(71) Applicant: The Board of Regents of the University of Oklahoma, Norman, OK (US)

(72) Inventor: Robert L. White, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 152 days.

(21) Appl. No.: 18/422,938

(22) Filed: Jan. 25, 2024

(65) Prior Publication Data

US 2024/0248024 A1 Jul. 25, 2024

Related U.S. Application Data

(60) Provisional application No. 63/440,944, filed on Jan. 25, 2023.

(51) Int. Cl.
*G01N 21/03* (2006.01)
*G01N 21/35* (2014.01)

(52) U.S. Cl.
CPC ......... *G01N 21/0332* (2013.01); *G01N 21/35* (2013.01)

(58) Field of Classification Search
CPC ............... G01N 21/0332; G01N 21/35; G01N 2021/3595; G01N 21/3563; G01N 21/3577; G01N 2021/0339

(Continued)

(56) References Cited

U.S. PATENT DOCUMENTS 5,470,757 A 11/1995 Gagnon et al.
5,519,218 A 5/1996 Chang
(Continued)

OTHER PUBLICATIONS

"Real-Time Monitoring of Polymer Heat Curing By Diamond ATR Spectroscopy", Harrick Scientific Products, Inc. (2021). Real-Time Monitoring of Polymer Heat curing by Diamond ATR Spectroscopy. In Application Note (Report No. 70305). https://www.harricksci. com.

(Continued)

*Primary Examiner* — Md M Rahman
(74) *Attorney, Agent, or Firm* — Crowe & Dunlevy, P.C.

(57) ABSTRACT

A variable temperature IR spectroscopy sample system includes a button sample holder and temperature control support assembly. The button sample holder may include a mesh sample retainer attached within a recess of a sample plate. A thermocouple can be used to determine the temperature of the mesh sample retainer. The temperature control support assembly is configured to support the button sample holder within the infrared spectrophotometer while controlling and adjusting the temperature of the sample contained within the button sample holder. The temperature control support assembly includes a thermoelectric module, generally comprising one or more thermoelectric chips (TECs), that is configured to selectively adjust the temperature of the button sample holder. The temperature control support assembly can also include a liquid coolant system to remove heat generated by the thermoelectric module and to maintain the temperature control support assembly at a relatively constant or ambient temperature.

15 Claims, 7 Drawing Sheets

(58) Field of Classification Search
USPC .......................................................... 356/244
See application file for complete search history.

(56)                     References Cited

U.S. PATENT DOCUMENTS

| | | | |
|---|---|---|---|
| 5,723,341 | A | 3/1998 | Truett |
| 5,764,355 | A | 6/1998 | Gagnon et al. |
| 6,280,690 | B1 | 8/2001 | Tadion |
| 11,047,796 | B2 | 6/2021 | White |
| 2004/0251414 | A1 | 12/2004 | Rodewald |
| 2016/0054343 | A1* | 2/2016 | Holmes ................ G01N 35/026 |
| | | | 422/65 |
| 2019/0226910 | A1 | 7/2019 | Messerschmidt et al. |
| 2020/0088646 | A1 | 3/2020 | Harris et al. |
| 2022/0107265 | A1* | 4/2022 | Gussakovsky ....... G01N 21/359 |

OTHER PUBLICATIONS

"Golden Gate High Temperature Heated Diamond ATR Top Plate", ManualsLib. (Aug. 10, 2022). SPECAC Golden Gate User Manual PDF download. https://www.manualslib.com/manual/2588579/Specac-Golden-Gate.html.
"VeeMAX III", VeeMAX III—PIKE Technologies. (n.d.). https://www.piketech.com/product/sr-veemax/.
"Agilent 4300 Handheld FTIR with MCT Detector", Agilent Technologies; "Agilent 4300 Handheld FTIR with MCT Detector"; Mar. 2014; 2 pages.
"Advances in Handheld FTIR Chemical Identification for Counter Terrorism and Defence", Arno, Josep, et al.; "Advances in Handheld FTIR Chemical Identification for Counter Terrorism and Defence"; 2013; 6 pages.
"FTIR Compact & Portable Systems—4300 Handheld FTIR", Agilent Technologies; "FTIR Compact & Portable Systems—4300 Handheld FTIR"; Mar. 2014; 6 pages.
"An Investigation into the Role of Portable Attenuated Total Reflectance Fourier Transform Infra Red Spectroscopy in the Presumptive Testing of Illicit Drugs", Litauszki, Greta; "An Investigation into the Role of Portable Attenuated Total Reflectance Fourier Transform Infra red Spectroscopy in the Presumptive Testing of Illicit Drugs"; King's College; London; May 15, 2010; 1 page.
"Analysis of Soil in the Field using portable FTIR", Robertson, A. H. Jean, et al.; "Analysis of Soil in the Field Using Portable FTIR"; International Workshop "Soil Spectroscopy: The Present and Future of Soil Monitoring" FAO HQ; Rome; Dec. 4-6, 2013; 20 pages.
"Alpha II FTIR Spectrometers", Bruker; "Alpha II FTIR Spectrometers—Technical Details"; Dec. 4, 2013; 5 pages.
"Tensor II", Bruker; "Tensor II FTIR Spectrometer—Overview"; Oct. 2015; 4 pages.
"Portable Infrared Spectroscopy Chemical Detectors Assessment Report", U.S. Department of Homeland Security; "Portable Infrared Spectroscopy Chemical Detectors Assessment Report"; Jun. 2016; 36 pages.
"FT-IR Spectroscopy Attenuated Total Reflectance (ATR)", Perkinelmer, Inc.; "FT-IR Spectroscopy Attenuated Total Reflectance (ATR)"; Sep. 22, 2004; 5 pages.
"Rapid Detection of Counterfeit Drugs of Ethambutol Hydrochloride and Cefuroxime Axetil using Handheld Raman, Near Infrared and Portable FTIR Technologies", Huong Le T. T., et al.; "Rapid Detection of Counterfeit Drugs of Ethambutol Hydrochloride and Cefuroxime Axetil using Handheld Raman, Near Infrared and Portable FTIR Technologies"; Sep. 1, 2014; 14 pages.

* cited by examiner

APPARATUS FOR VARIABLE TEMPERATURE INFRARED SPECTROSCOPY WITH A BUTTON SAMPLE HOLDER

RELATED APPLICATIONS

This application claims the benefit of U.S. Provisional Patent Application Ser. No. 63/440,944 filed Jan. 25, 2023 and entitled, "Apparatus for Variable Temperature Infrared Spectroscopy with a Button Sample Holder," the disclosure of which is herein incorporated by reference as if fully set forth herein.

BACKGROUND OF THE INVENTION

Infrared spectroscopy involves the study of infrared light interacting with samples. Infrared light is light in the electromagnetic spectrum ranging in wavelength from about 700 nanometers (nm) to about 1 millimeter (mm) and may also be referred to as infrared radiation. When infrared light passes through a sample, some of it may be absorbed. By dividing the infrared radiation intensity emerging from a sample by the intensity measured prior to encountering the sample, the transmittance or reflectance of a sample can be computed. Transmittance describes radiation that continues along the same direction after interacting with the sample. Reflectance is used when the direction of radiation is altered by interactions with the sample. The infrared spectrum (transmittance or reflectance) of a sample is a plot of this fraction as a function of wavelength. The shape of the plot depends on sample properties and therefore can be used to describe sample characteristics at a molecular level.

When undergoing infrared spectroscopy, many solid samples exhibit excessive absorbance and therefore require dilution in non-absorbing matrices in order to be analyzed. Pelletization and mulling are two approaches to dilution. In pelletization, a test sample material in powder form is mixed with a diluent powder such as salt (e.g., KCl, NaCl, or KBr) or metal. The mixture is placed into a die and compressed to form a pellet, which can then be analyzed with a spectrophotometer. However, a non-homogeneous distribution of the sample material within the pellet may cause infrared spectrum artifacts, and a large particle size in the sample material may make an absorbance appear larger than it really is. In mulling, a test sample material in powder form is mixed with a liquid diluent such as a mineral oil, forming a thick suspension called a mull. The mull is placed between KCl or NaCl plates before being placed in the spectrophotometer. However, the diluent may cause an absorbance spectrum to demonstrate features representative of the diluent, which obscure features representative of the sample.

Instead of dilution, one may directly analyze solid samples using infrared microscopes, photoacoustic spectroscopy, or attenuated total reflectance (ATR). However, use of infrared microscopes requires using visible optics to isolate a single particle of a sample and using infrared optics to pass an infrared light with a short path length through the single particle. Photoacoustic spectroscopy requires sealing a sample in a chamber, purging the chamber with an inert gas, directing a modulated infrared light towards the sample, and detecting resulting sound waves with a microphone. Those two approaches therefore require significant preparation, and infrared microscopes are expensive. In ATR, a powder test sample material is placed onto a surface of a high-refractive index crystal and pressed with a clamp into the crystal to form a good contact between the powder and the crystal surface. An infrared light is then directed into the crystal so that the infrared light reflects at a crystal-sample boundary. The quality of resulting spectra depend on how well the sample makes contact with the crystal, and penetration of the infrared light into the sample is wavelength dependent, so relative peak intensities in measured spectra differ from transmission measurements. In addition, the clamp may scratch the crystal, requiring replacement of the crystal, which is a significant cost.

As an alternative to using a high-refractive index crystal to support the sample, wire mesh sampling tools have also been developed. These sampling tools typically include a plate having a mesh attached thereto. When a sample material, such as a powder, is pressed into the mesh and the excess sample material extending above the top of the mesh is scraped off, thereby leveling the sample material in the cavity, a level sample of the material having a consistent height and density is obtained for testing. Because the mesh is relatively shallow, the resulting sample is thin, providing a short path length for infrared light to pass through the sample, thus reducing undesired infrared light absorption and providing a better spectrum. The sampling tool allows for testing neat samples (samples with no diluent), thus eliminating the effects a diluent would have on a measured spectrum. A mesh-based sampling tool and associated sampling method are disclosed in U.S. Pat. No. 11,047,796, the disclosure of which is incorporated by reference as if fully set forth herein. These types of sample holders are sometimes referred to as "button" sample holders.

Although existing button sample holders overcome some of the deficiencies of high-refractive index crystals, there remains a need for an improved system for controlling the temperature of the sample within the bottom portion of the sample holder. Like the sample surface used in ATR, the button is an "open" sample holder because the material being analyzed is not confined within a sealed container. This can be a disadvantage when analyzing volatile liquids, which typically require sealed cells to prevent evaporation losses. Affixing windows to the button surface could slow evaporation, but this would also diminish measurement signal-to-noise ratios. Cooling the sample could mitigate the evaporation of volatile samples by reducing vapor pressures.

Conversely, controlled heating of the sample in the button sample holder is useful for variable temperature IR spectroscopy studies. In the past, investigators have used convective heating to raise the temperature of the button sample for variable temperature infrared spectroscopy studies. In these systems, heated air is directed at the bottom surface of the button sample holder. Temperatures of materials loaded in the wire mesh are varied by changing the amount of heat transferred from the metal backing to the sample. Sample temperatures are measured by a thermocouple pressed against the wire mesh. Although generally effective, the use of convective heating can present complications, particularly if portions of the button sample holder and the sample stage expand at different rates to adversely affect optical alignment.

Accordingly, a need exists for a system that more efficiently, effectively and precisely controls the temperature of a button sample holder.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness.

DETAILED DESCRIPTION

Figure 1:
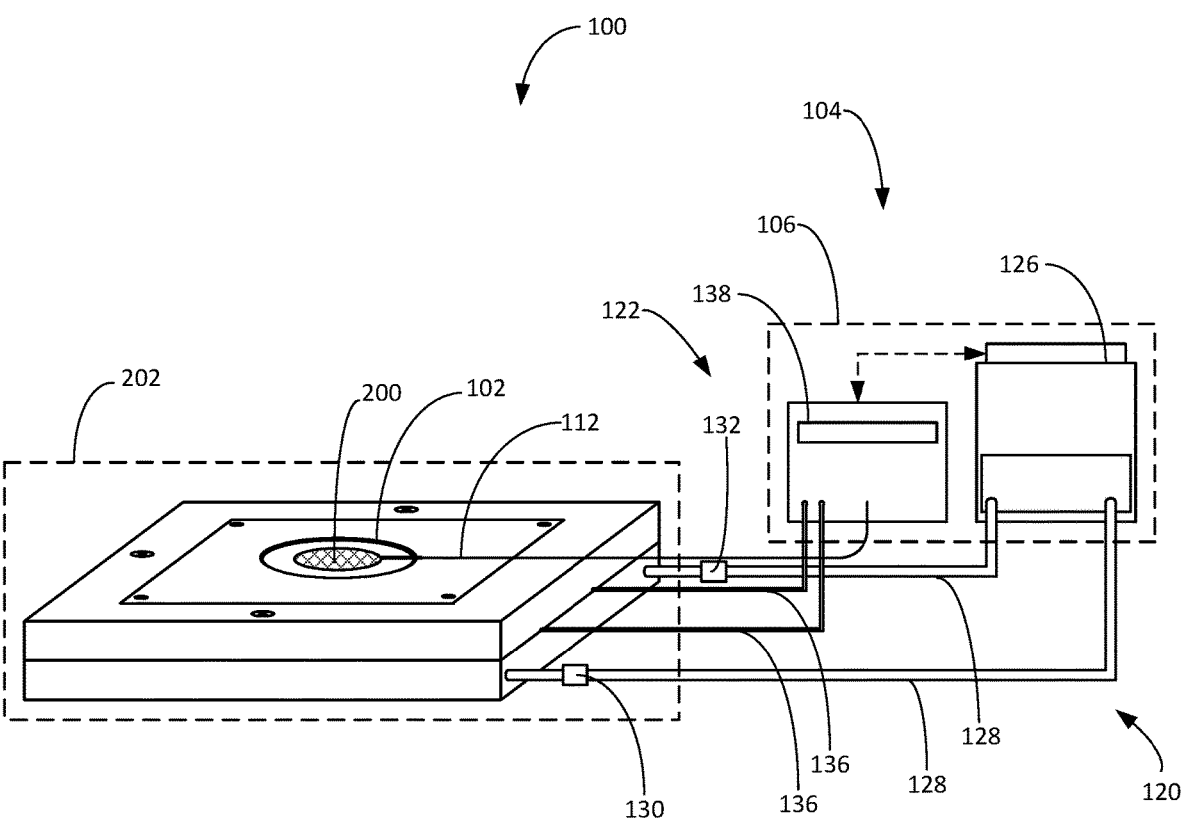
FIG. 1 depicts the variable temperature IR spectroscopy sample system constructed in accordance with an exemplary embodiment.

The present disclosure is generally directed to a variable temperature IR spectroscopy sample system that includes a button sample holder and temperature control support assembly. In some embodiments, the button sample holder includes a mesh sample retainer that is attached within a recess in a sample plate. A thermocouple can be used to determine the temperature of the mesh sample retainer. The temperature control support assembly is configured to support the button sample holder within the infrared spectrophotometer while controlling and adjusting the temperature of the sample contained within the button sample holder. The temperature control support assembly includes a thermoelectric module that is configured to selectively adjust the temperature of the button sample holder. The temperature control support assembly can also include a liquid coolant system or fan to remove heat generated by the thermoelectric module and to maintain the temperature control support assembly at a relatively constant or ambient temperature.

The variable temperature IR spectroscopy sample system permits variable temperature infrared spectroscopic studies of neat liquids and solid powder samples. Samples can be analyzed by employing various heating and cooling profiles, including linear temperature heating and cooling ramps and temperature steps. Linear temperature ramp measurements can be used to monitor infrared band wavenumber and intensity variations over a wide sample temperature range. Alternatively, when investigating the effects of heating samples to selected temperatures, a heating step profile, which provides isothermal spectrum measurements and requires less time, can be employed. Various temperature change profiles may be programmed to study specific reversible and irreversible sample changes.

In general, in a first aspect, a test sample system is disclosed for carrying out a testing protocol on a sample at one or more temperatures within a spectrophotometer. The system includes a button sample holder configured to hold the sample during the testing protocol and a temperature control support assembly, which supports the button sample holder and controls the temperature of the sample in the button sample holder. The temperature control support assembly includes a thermoelectric heat transfer system, having at least one thermoelectric chip (TEC) in direct contact with the button sample holder, and a liquid cooling system.

In general, in a second aspect, a test sample system is disclosed for use within a spectrophotometer in carrying out a testing protocol on a sample at one or more temperatures. The system includes a button sample holder and a temperature control support assembly. The button sample holder is supported by the temperature control assembly and is configured to hold the sample during the testing protocol. The temperature control support assembly supports controls the temperature of the sample in the button sample holder using a thermoelectric heat transfer system with two or more TECs and a liquid cooling system.

In general, in a third aspect, a method is disclosed for the variable temperature infrared spectroscopy analysis of a test sample using a spectrophotometer. The method includes the steps of loading the sample in a button sample holder and placing the loaded button sample holder onto a temperature control support assembly. The loaded button sample holder and temperature control support assembly are placed into the spectrophotometer, and the sample temperature is changed to a setpoint temperature with a thermoelectric chip in the temperature control support assembly. The spectrophotometer is then used to take a measurement of the sample at the setpoint temperature.

Before describing various embodiments of the present disclosure in more detail by way of exemplary description, examples, and results, it is to be understood that the embodiments of the present disclosure are not limited in application to the details of methods and apparatus as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that certain embodiments of the present disclosure can be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the methods and apparatus of the embodiments of the present disclosure have been described in terms of particular embodiments, it will be apparent to those of skill in the art that variations may be applied thereto and in the steps or in the sequence of steps of the methods described herein without departing from the spirit and scope of the inventive concepts. All such similar substitutes and modifications apparent to those skilled in the art are deemed to be within the spirit and scope of the systems as defined herein.

As utilized in accordance with the methods and apparatus of the embodiments of the present disclosure, the following terms, unless otherwise indicated, shall be understood to have the following meanings.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., time or frequency) should be read once as modified by the term "about" (unless already expressly so modified), and then read again as not so modified unless otherwise indicated in context. The use of the term "about" or "approximately" may mean a range including ±0.5%, or ±1%, ±2%, or ±3%, or ±4%, or ±5%, ±6%, or ±7%, or ±8%, or ±9%, or ±10%, or ±11%, or ±12%, or ±13%, or ±14%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 80% of the time, or at least 90% of the time, or at least 95% of the time, or at least 98% of the time.

Features of any of the embodiments described herein may be combined with any of the other embodiments to create a new embodiment. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50. Similarly, fractional amounts between any two consecutive integers are intended to be included herein, such as, but not limited to, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, and 0.95. For example, the range 3 to 4 includes, but is not limited to, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, and 3.95. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Reference to a series of ranges includes ranges which combine the values of the boundaries of different ranges within the series. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range.

Thus, to further illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

The present disclosure will now be discussed in terms of several specific, non-limiting, examples, and embodiments. The examples described below, which include particular embodiments, will serve to illustrate the practice of the present disclosure, it being understood that the particulars shown are by way of example and for purposes of illustrative discussion of particular embodiments and are presented in the cause of providing what is believed to be a useful and readily understood description of procedures as well as of the principles and conceptual aspects of the present disclosure.

Referring now to the figures of the drawings, wherein like numerals of reference designate like elements throughout the several views, and initially to FIG. 1, a variable temperature IR spectroscopy sample system 100 is depicted in accordance with an exemplary embodiment. The variable temperature IR spectroscopy sample system 100 includes a button sample holder 102, a temperature control support assembly 104 and a control system 106. The variable temperature IR spectroscopy sample system 100 is configured to support a sample 200 inside a spectrophotometer 202 (e.g., a Fourier-transform infrared spectroscopy (FTIR) spectrophotometer) or similar analytical instrument. The control system 106 is configured to control the performance of the variable temperature IR spectroscopy sample system 100 in response to a test protocol, which can include a variable temperature profile achieved through manual or automated mechanisms. The control system 106 can be integrated into the spectrophotometer 202, a single computer-implemented system, or compiled from separate and distinct control modules.

Figure 2A:
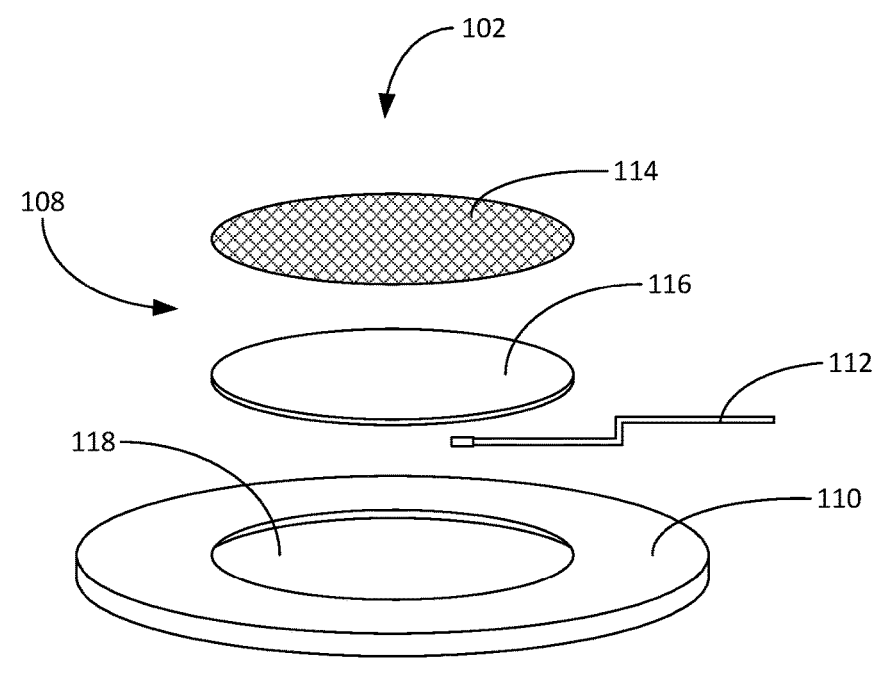
FIGS. 2A-2C depict exploded, perspective and cross-sectional views of the button sample holder constructed in accordance with an exemplary embodiment.
Figure 2B:
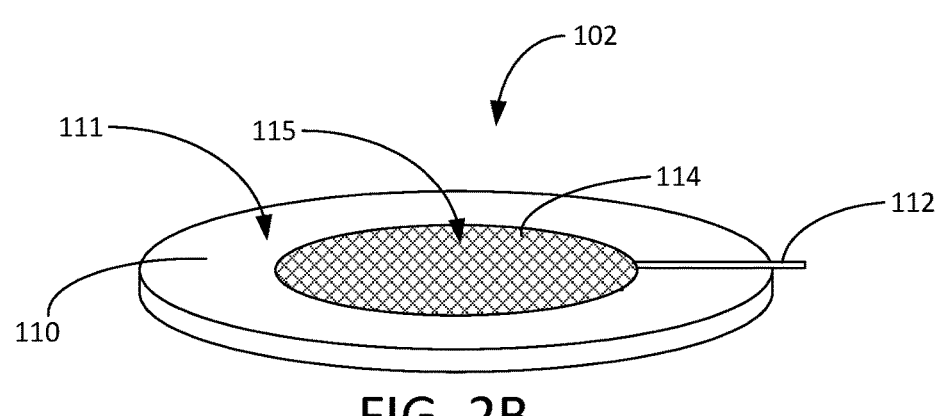
Figure 2C:
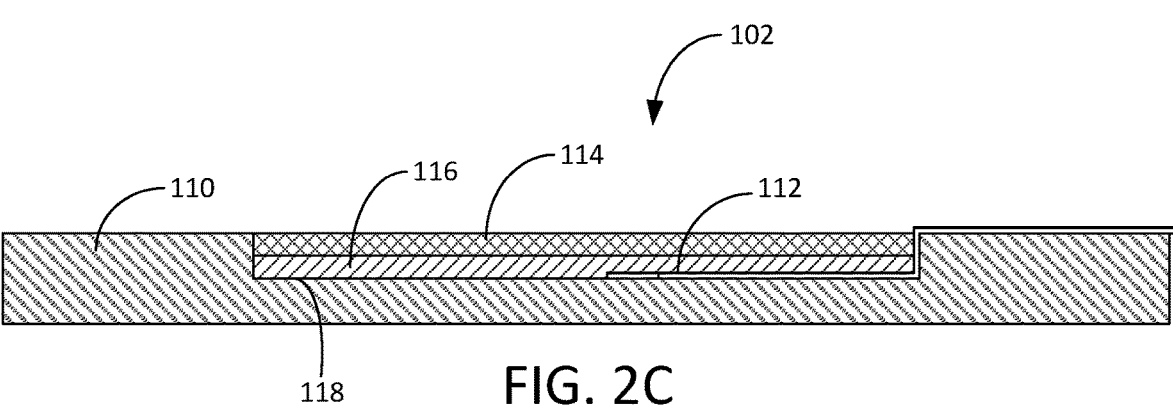

Referring now also to FIGS. 2A-2C, shown therein are exploded, assembled, and cross-sectional views, respectively, of the button sample holder 102. The button sample holder 102 includes a mesh sample retainer 108, a sample plate 110, and a thermocouple 112. The mesh sampler retainer 108 includes a mesh disc 114 and a solid backing member 116. The mesh disc 114 and backing member 116 can both be manufactured from stainless steel, with the mesh disc 114 welded to the backing member 116. In some embodiments, the mesh disc 114 and backing member 116 each have an outer diameter of between about 1 mm and about 40 mm, more particularly between about 3 mm and about 39 mm, more particularly between about 4.5 mm and about 21 mm, and more particularly about 6 mm (i.e., about 0.25 inches), with the mesh disc 114 having a thickness from about 50 μm to about 300 μm, and the backing member 116 having a thickness from about 0.2 mm to about 1. mm, more particularly about 0.30 mm.

In some embodiments, the sample plate 110 is an aluminum disc that includes a mesh sample retainer recess 118. The sample plate 110 can be constructed from thin (e.g., 1.5 mm thick) aluminum, with a polished lower surface to ensure good contact with the heat transfer components within the temperature control support assembly 104. The mesh sample retainer recess 118 is sized and configured to receive the mesh sample retainer 108 such that the top surface 115 of the mesh disc 114 is substantially flush with the top surface 111 of the sample plate 110. In some embodiments, the mesh sample retainer recess 118 has approximately the same diameter as the mesh sample retainer 108 (e.g., about 0.25 inches) and a depth of between about 0.2 mm and about 1.3 mm. Although the mesh sample retainer 108 and sample plate 110 are both depicted as substantially cylindrical, it will be appreciated that the mesh sample retainer 108 and sample plate 110 can be box shaped or any other shape.

The thermocouple 112 can be spot welded or otherwise secured to the bottom of the backing member 116. The thermocouple 112 may be positioned such that the hot junction of the thermocouple 112 contacts the backing member 116 approximately at its center. In some embodiments, the thermocouple 112 is an Omega Engineering Inc. (Norwalk, CT) CHAL010 type K thermocouple that is well suited for providing temperature measurements of the sample 200 and the mesh sample retainer 108. The mesh sample retainer 108 can be secured within the mesh sample retainer recess 118 with a high temperature epoxy, such as JB Weld (Sulfur Springs, TX) epoxy to form the button sample holder 102. The assembly and use of the button sample holder 102 is described in greater detail in U.S. Pat. No. 11,047,796 B2 entitled "Sampling Tool and Method for Infrared Spectroscopy," the entire disclosure of which is herein incorporated by reference.

Figure 3A:
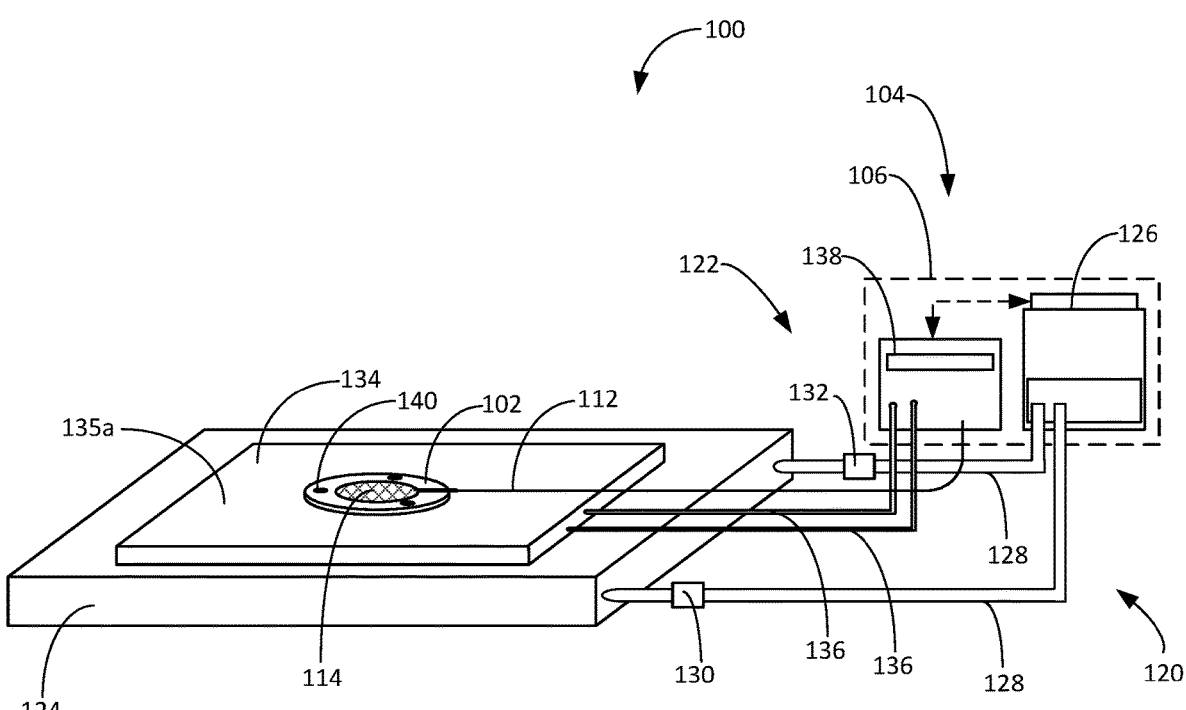
FIGS. 3A-3B depict a perspective and partial cross-sectional side view of the button sample holder positioned on a first embodiment of the temperature control support assembly.
Figure 3B:
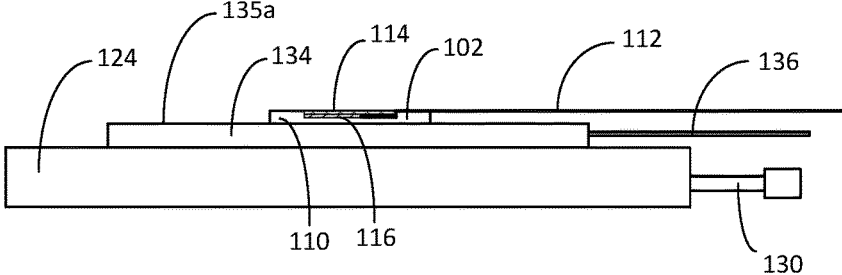

Turning to FIGS. 3A-3B, shown therein are perspective and partial side cross-sectional views, respectively, of the button sample holder 102 installed on a first embodiment of the temperature control support assembly 104. In this embodiment, the temperature control support assembly 104 includes a liquid cooling system 120 and a thermoelectric heat transfer system 122 that cooperate to adjust the temperature of the button sample holder 102. The liquid cooling system 120 includes a cooling block 124 and a recirculating chiller 126 that chills and recirculates a coolant liquid to the cooling block 124. The recirculating chiller 126 is connected to the cooling block 124 through lines 128. The lines 128 can be connected to the cooling block 124 at an inlet 130 and outlet 132 for delivering the coolant liquid to and from the cooling block 124, respectively. In some applications, the liquid cooling system 120 is configured to deliver a continuous flow of, for example, a 50:50 water/ethylene glycol mixture to the cooling block 124 with a 13 L/min flow rate. Any suitable cooling liquid can be used. Suitable recirculating chillers 126 are available from ThermoFisher Scientific (Waltham, MA). The liquid cooling system 120 can be used to bring the button sample holder 102 to an ambient temperature (e.g., without TEC power), to maintain a relatively constant or ambient temperature, or to remove heat generated by the thermoelectric heat transfer system 122. Ambient temperature of the button sample holder 102 is generally related to the temperature of the coolant liquid in the cooling block 124. In various non-limiting embodiments, the cooling block 124 is maintained at a temperature from about –18° C. to about 37° C.

The thermoelectric heat transfer system 122 includes a thermoelectric chip (TEC) 134, leads 136, and a thermoelectric driver module 138. The TEC 134 functions as a Peltier device that can be used to transfer heat to or from button sample holder 102 depending on the polarity of the voltage applied to the TEC 134 through the leads 136 by the thermoelectric driver module 138. A suitable TEC is available from CUI Devices (Lake Oswego, OR) under the CP6030395 product reference. The button sample holder 102 can be secured to the surface of the TEC 134 with fasteners 140, a suitable adhesive, or clamping pressure. A thin layer of thermal paste can be applied to encourage good heat exchange between the polished bottom of the sample plate 110 and an upper surface 135*a* of the TEC 134.

An Accuthermo (Fremont, Currently Amended) model ATEC302 temperature controller and FTX700DX H-bridge amplifier can be used as the driver module 138 to provide a controllable source of DC power to the TEC 134. The thermocouple 112 can be connected to the driver module 138 to provide a feedback system in which the thermoelectric driver module 138 applies current to the TEC 134 in response to a temperature measurement from the thermocouple 112 to raise or lower the temperature of the sample 200 to a desired setpoint temperature. In some embodiments, the thermoelectric driver module 138 and recirculating chiller 126 are integrated into the control system 106, which can be further integrated into the spectrophotometer 202. The control system 106 can be configured to direct the thermoelectric driver module 138 to heat or cool the sample 200 to a single setpoint for an isothermal measurement, or to adjust the temperature of the sample 200 according to a temperature profile within a test protocol. For example, the control system 106 can be configured to increase the temperature of the sample 200 according to a linear, cyclic, exponential or stepped temperature profile in coordination with measurements taken by the spectrophotometer 202. Linear ramp heating profiles can be used, for example, to calculate isoconversion effective activation energies for thermal decomposition of the sample 200. The infrared spectra acquired during linear temperature ramps can also reveal temperature-dependent spectral variations that correlate with specific sample changes. These infrared spectra are not isothermal measurements. Instead, they represent the average of interferograms obtained over a narrow (e.g., about 2° C.) temperature range. However, infrared spectra can be measured isothermally at selected temperatures by employing a stepped temperature profile. Difference spectra derived from isothermal measurements made during stepped increasing temperature profiles permit discrimination between reversible and irreversible changes. In this mode, measurements are made while the sample temperature is held constant (i.e., ±0.2° C.). After each stepped temperature spectrum measurement, rapid heating or cooling to reach the next programmed temperature is desired to minimize total analysis times.

Figure 4A:
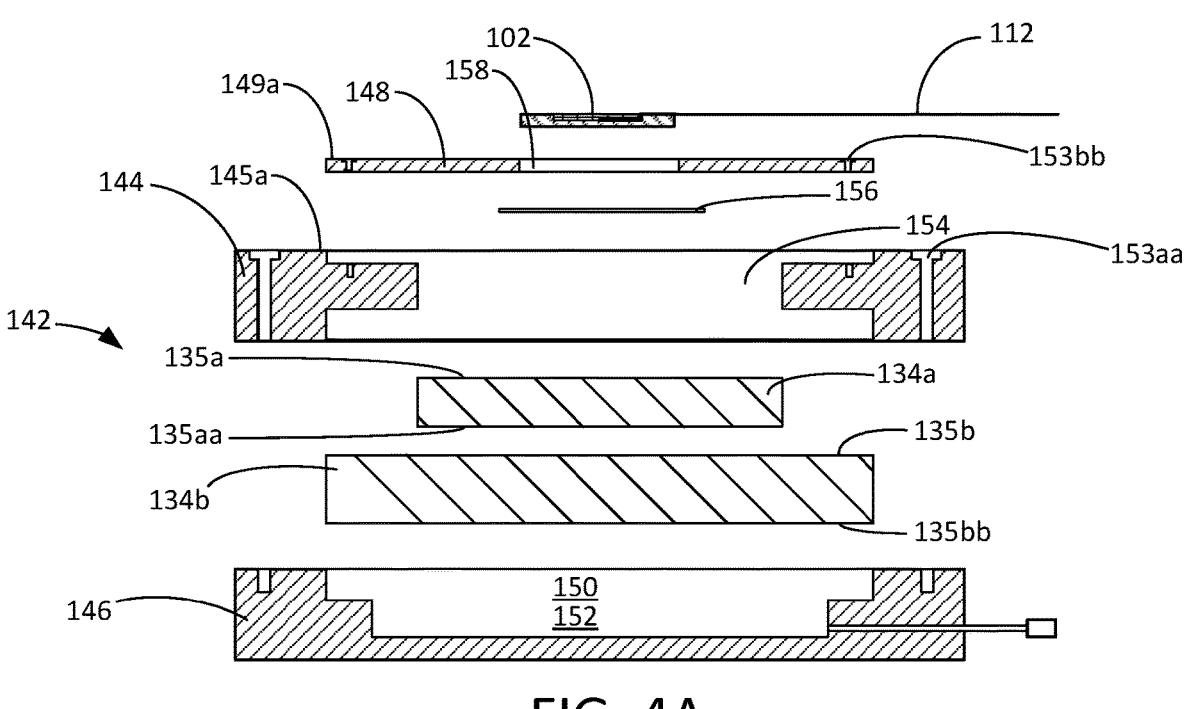
FIGS. 4A-4C depict exploded, cross-sectional and perspective views of the button sample holder positioned on a second embodiment of the temperature control support assembly.
Figure 4B:
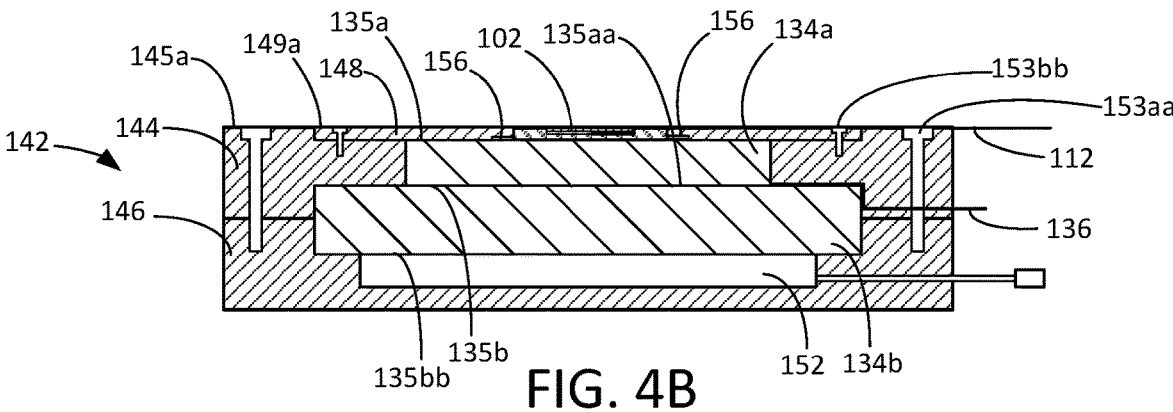
Figure 4C:
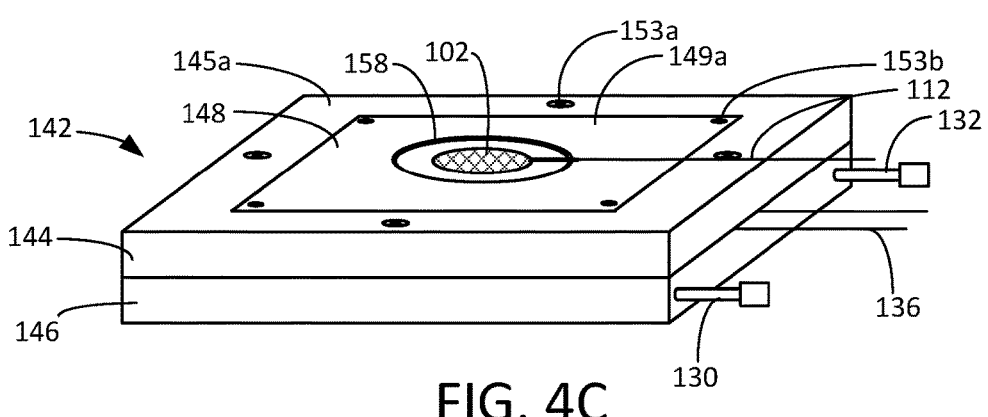

Turning to FIGS. 4A-4C, shown therein are exploded cross-sectional, assembled cross-sectional, and perspective views, respectively, of a second embodiment of the temperature control support assembly 104. Like the embodiment depicted in FIGS. 3A-3B, the embodiment of the temperature control support assembly 104 depicted in FIGS. 4A-4C includes the liquid cooling system 120 and the thermoelectric heat transfer system 122. However, in the embodiment depicted in FIGS. 4A-4C, the thermoelectric electric heat transfer system 122 includes a first TEC 134*a* and a second TEC 134*b* that are stacked together and captured within a housing 142. The first TEC 134*a* has an upper surface 135*a* and a lower surface 135*aa*. The second TEC 134*b* has an upper surface 135*b* and a lower surface 135*bb*. In such a configuration the lower surface 135*aa* of the first TEC 134*a* is located so that it faces and is positioned planarly against the upper surface 135*b* of the second TEC 134*b*. The first and second TECs 134*a*, 134*b* can be controlled together or separately to transfer heat to and from the button sample holder 102. Suitable TECs are available from Analog Technologies, Inc. (San Jose, CA), which together can produce an operating temperature range between −55° C. and 200° C.; however, the disclosure is not limited to the use of TECs from this supplier. In one embodiment, the heat generated by the first TEC 134*a* is removed by the second TEC 134*b* beneath it, permitting ambient sample temperatures to be determined by the lower TEC 134*b* temperature, which can be adjusted more quickly than the coolant liquid temperature in the cooling block 124.

The housing 142 includes a first plate 144, a second plate 146 and a cover plate 148. The second plate 146 includes a second chamber 150 and a coolant reservoir 152 below the second chamber 150. The second chamber 150 is sized to accept a lower portion of the second TEC 134*b*. The second TEC 134*b* can be secured within the second chamber 150 with a silicone adhesive or other sealant to prevent coolant from escaping the coolant reservoir 152. In this way, a portion of the lower surface 135*bb* of the second TEC 134*b* is exposed to the recirculating coolant inside the coolant reservoir 152. In various non-limiting embodiments, the coolant reservoir holds between about 1 mL and about 5 mL of liquid coolant, more particularly between about 1.5 mL and about 3 mL of liquid coolant, more particularly about 1.8 mL of liquid coolant.

The first plate 144 includes a first chamber 154 that is configured to accept an upper portion of the second TEC 134*b*, the first TEC 134*a*, and the cover plate 148. When the first plate 144, the second plate 146, and cover plate 148 are brought together (as depicted in FIG. 4B), the first and second TECs 134*a*, 134*b* are captured within the first and second chambers 154, 150. Capturing the first and second TECs 134*a*, 134*b* in this manner maintains the alignment of the first TEC 134*a* relative to the second TEC 134*b* by preventing lateral movement. The first and second plates 144, 146 can be secured together with fasteners 153*a* disposed through plate apertures 153*aa*, a suitable adhesive, or clamping pressure. The cover plate 148 can be fastened to the first plate 144 to apply a clamping force to the first and second TECs 134*a*, 134*b*. The cover plate 102 can be secured to the first plate 144 with fasteners 153*b* disposed through cover plate apertures 153*bb*, a suitable adhesive, or clamping pressure. Thermal paste can be applied between the first and second TECs 134*a*, 134*b* to ensure good heat exchange through the thermoelectric transfer system 122. To further secure the first and second TECs 134*a*, 134*b*, an o-ring seal 156 can be positioned between the cover plate 148 and the upper surface 135*a* of the first TEC 134*a*, where the o-ring seal 156 has a diameter (e.g., 1 inch) that is generally larger than the outer diameter of the sample plate 110. Suitable materials for the o-ring seal 156 include rubber.

The cover plate 148 includes a button aperture 158 that has diameter that is substantially the same as the outer diameter of the sample plate 110. The cover plate 148 has a thickness that is substantially the same as the button sample holder 102. The button sample holder 102 can be placed into the button aperture 158 such that the polished bottom of the sample plate 110 is in contact with the upper surface 135*a* of the first TEC 134*a* while the top surface 115 of the mesh disc 114 is substantially flush with an upper surface 149*a* of the cover plate 148 and an upper surface 145*a* of first plate 144. The o-ring seal 156 is positioned concentrically relative to the button aperture 158 in the center of the cover plate 148. The housing 142 provides a secure system for containing two or more thermoelectric chips (e.g., first and second TECs 134*a* and 134*b*) in a manner that provides good heat transfer with the button sample holder 102 and the internal coolant reservoir 152. The button sample holder 102 can be easily inserted and removed from the temperature control support assembly 104 to facilitate sample loading and cleaning of the button sample holder 102. The variable temperature IR spectroscopy sample system 100 can be mounted on a slide (not shown) so that samples 200 could be introduced and removed from the spectrophotometer 202 through a slot opening without loss of instrument purge.

Figure 5:
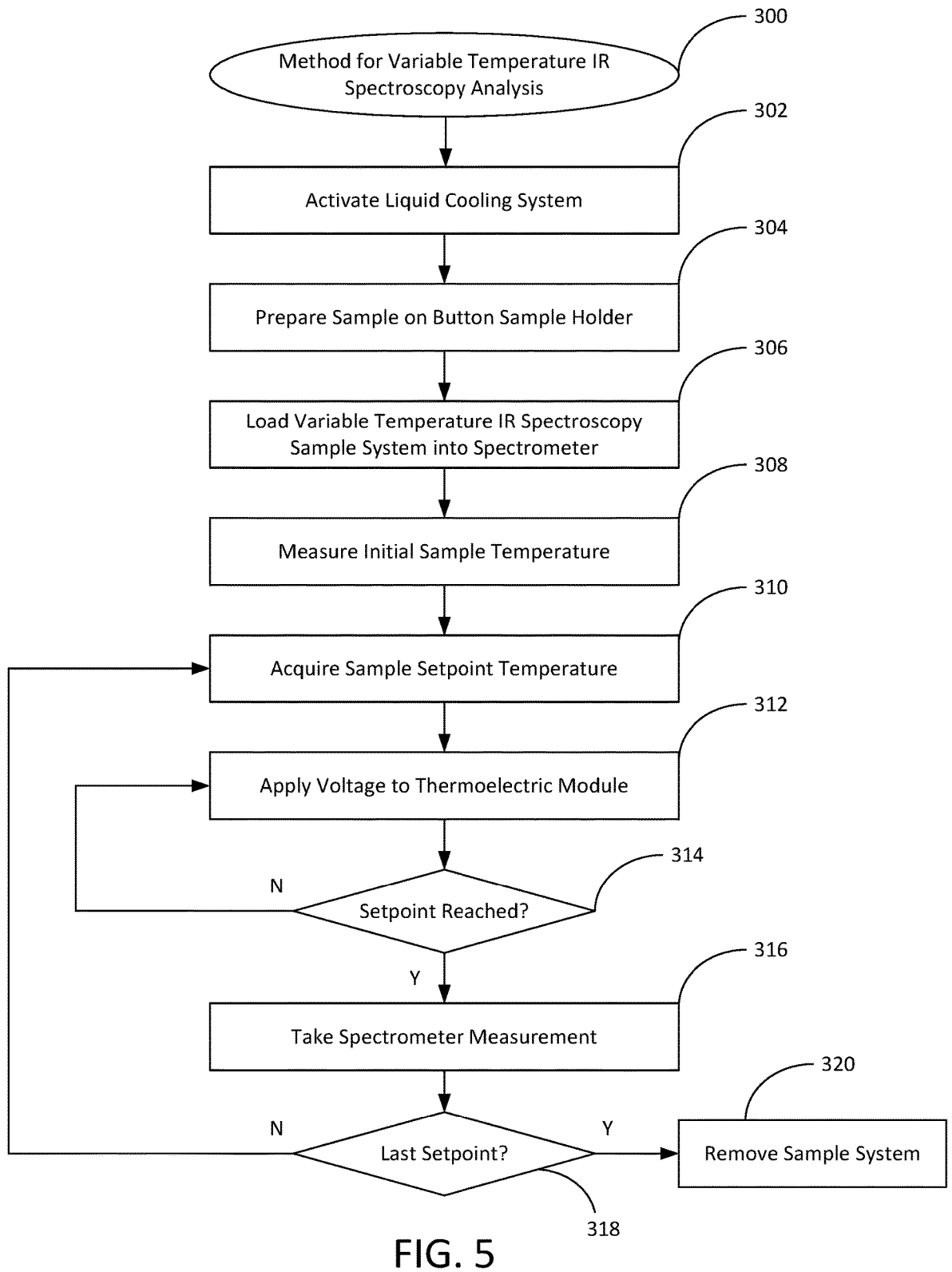
FIG. 5 provides a process flow chart for a method of using the variable temperature IR spectroscopy sample system to obtain spectroscopy readings at multiple temperatures.

Turning to FIG. 5, shown therein is a process flow diagram for an exemplary method 300 for carrying out a variable temperature IR spectroscopy analysis using one or more embodiments of the variable temperature IR spectroscopy sample system 100 assembled according to the disclosure set forth above. The method 300 begins at step 302, when the liquid cooling system 120 is activated to circulate the liquid coolant to the cooling block 124 or coolant reservoir 152. At step 304, the sample 200 is loaded into the mesh voids of the mesh disc 114 of the button sample holder 102. The sample 200 can be a liquid or powder, with excess sample removed from the surface of the mesh disc 114. By preparing a thin layer of sample 200 within the mesh disc 114, fine powders may be analyzed without diluting them in a non-absorbing matrix. It will be understood that steps 302 and 304 can be reversed in order, or carried out simultaneously.

At step 306, the variable temperature IR spectroscopy sample system 100 is placed into the spectrophotometer 202. At step 308, the initial temperature of the sample 200 is obtained using the thermocouple 112. The initial temperature of the sample 200 can be provided directly as an input to the control system 106. At step 310, the sample setpoint temperature is acquired from a temperature profile loaded into the control system 106 as part of a testing protocol. Suitable sample temperatures include temperatures between about −50° C. and about 200° C., more particularly between about 0° C. and about 100° C. Using the testing protocol and temperature profile, the thermoelectric driver module 138 applies a voltage to the one or more TECs 134 to transfer heat to or from the sample 200 at step 312. At step 314, the control system 106 determines whether the sample 200 has reached the setpoint temperature. If the setpoint temperature has not been reached, the method returns to step 312 and the thermoelectric driver module 138 continues applying voltage to the one or more TECs 134.

If the setpoint temperature is reached at step 314, the method continues to block 316 and one or more measurements are taken by the spectrophotometer 202. Once the desired measurements have been taken, the process continues to step 318. If the testing protocol does not call for any additional measurements, the method 300 concludes at step 320, and the variable temperature IR spectroscopy sample system 100 can be removed from the spectrophotometer 202. If additional measurements are required at new setpoints, the method 300 returns to step 310 and the next setpoint temperature is acquired. The method 300 continues to take measurements with the spectrophotometer 202 at each of the setpoints within the temperature profile until the testing protocol has been completed.

EXAMPLES

The variable temperature IR spectroscopy sample system 100 and methods of using the same are further illustrated by the following examples, which are provided for the purpose of demonstration rather than limitation.

Example 1

The variable temperature IR spectroscopy sample system selected for this Example used a single TEC, an aluminum cooling block, and a button sample holder having a 100- mesh stainless-steel mesh disc with 140 mm square voids. The TEC and cooling block surfaces were coated with a thin layer of thermal paste (Arctic Silver 5) to maximize thermal conductivity and clamped together in an aluminum fixture to promote contact and restrict component movements. Sample temperatures were measured using a type K thermocouple, and temperatures were varied by changing the DC power (12 V, 6 A max). By using an H-bridge amplifier, the temperature controller in the driver module could heat and cool the TEC surface in small increments, preventing large set point overshoots and providing reproducible heating and cooling rates and ±0.2° C. isothermal temperatures. Infrared spectrum measurements were obtained using a Nova Cygni 120 FTIR spectrophotometer from Mattson Instruments Inc. (Madison, WI) and a Praying Mantis™ diffused reflection accessory from Harrick Scientific Inc. (Pleasantville, NY).

When the variable temperature IR spectroscopy sample system was positioned at the diffuse reflectance accessory focal point, temperatures at the button sample holder depended on the spectrophotometer purge gas, the TEC temperatures, and the radiant heating provided by the infrared source. Sample temperatures were varied by changing the voltage applied to the TEC. When cooling, heat pumped from the button sample holder by the TEC and the heat generated by device operation were transferred to the cooling block. To heat the sample, the TEC power supply polarity was reversed to pump energy from the TEC into the button sample holder. Because excessive heat could damage piezoelectric components, TEC power was disconnected when the temperature exceeded 100° C. to ensure that TEC internal components were not damaged. Although sample heating was restricted in this study, a more robust TEC internal architecture could permit temperatures approaching 200° C.

To maintain a constant temperature at the button sample holder, the heat pumped by the TEC was continually removed by a cooling block, which was filled with a 50:50 water/ethylene glycol mixture flowing from a constant temperature bath.

Figure 6:
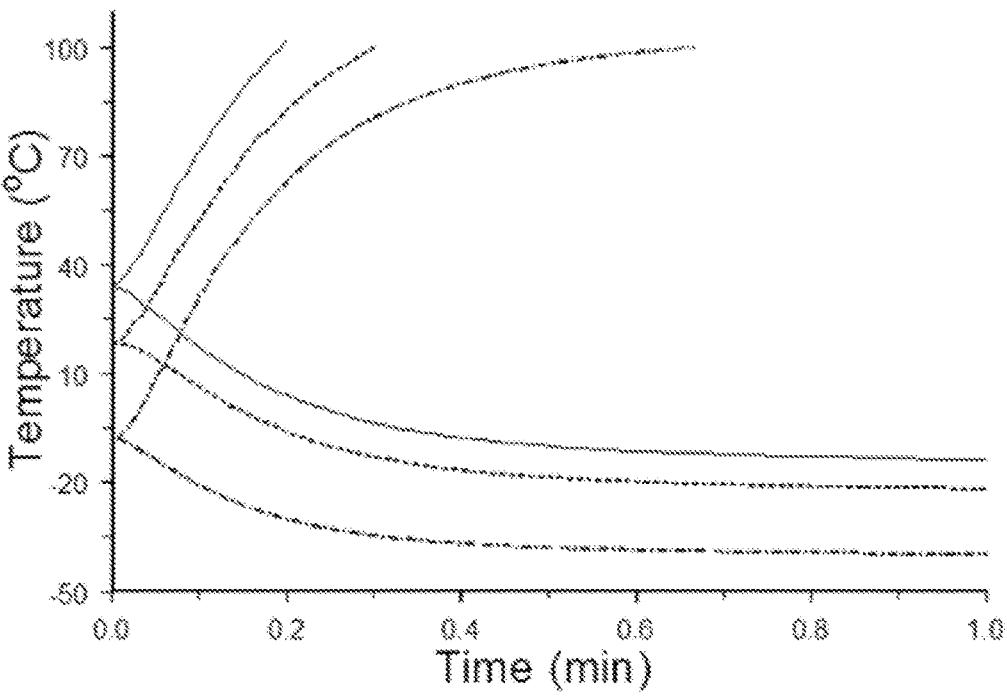
FIG. 6 depicts maximum heating and cooling temperature profiles beginning from different ambient temperatures for the variable temperature IR spectroscopy sample system in accordance with an exemplary embodiment.

As shown in FIG. 6, the heating and cooling properties of the variable temperature IR spectroscopy sample system were dependent on the ambient temperature of the button sample holder without TEC power. The plots in FIG. 6 depict maximum heating and cooling temperature profiles beginning at different ambient temperatures and applying full power (12 V, 6 A) to the TEC. An ambient temperature of 34° C. was achieved for the button sample holder where the coolant liquid was 37° C. Reducing the coolant liquid temperature to 12° C. and −18° C. lowered the ambient temperatures of the button sample holder to 19° C. and −8° C., respectively.

Figure 7:
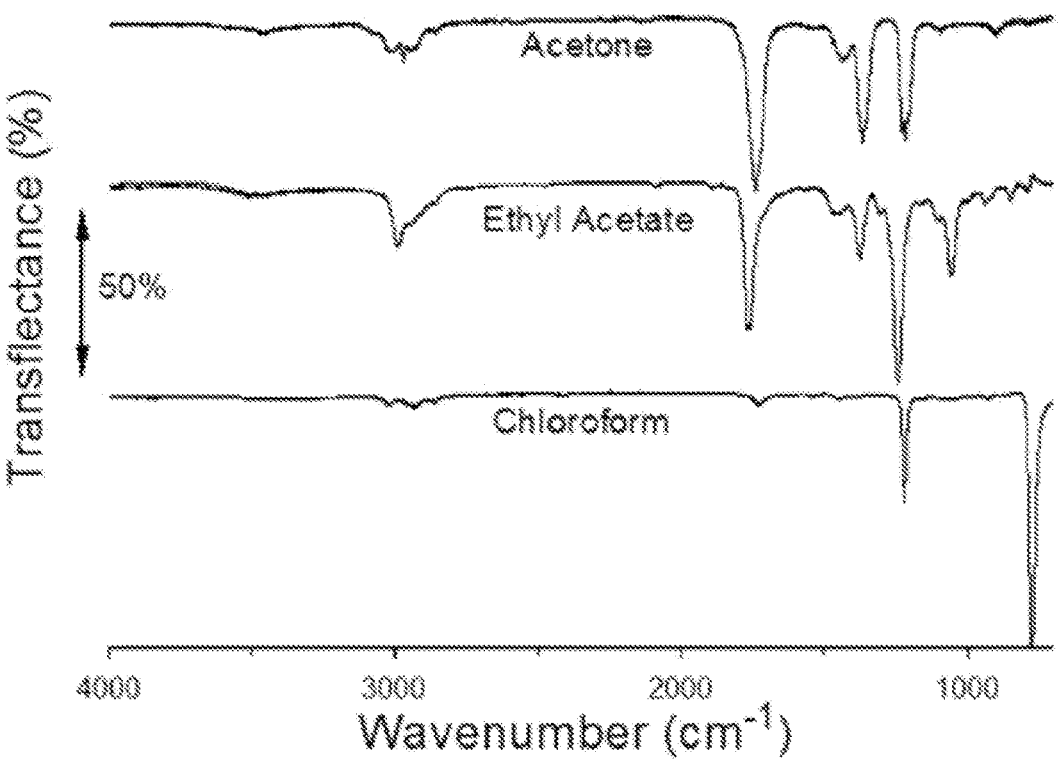
FIG. 7 depicts overlays of infrared spectra for acetone, ethyl acetate, and chloroform obtained at 10° C. by the variable temperature IR spectroscopy sample system in accordance with an exemplary embodiment.

FIG. 7 is an overlay of three replicate infrared spectra for acetone (CAS: 67-64-1), ethyl acetate (CAS: 141-78-6), and chloroform (CAS: 67-66-3) measured at 10° C. As depicted in FIG. 7, whether heating or cooling, temperatures varied exponentially with time. The heating and cooling profiles in FIG. Y changed significantly when the coolant liquid temperature was varied. In general, lowering the coolant liquid temperature provided lower button sample holder temperatures at the expense of reduced maximum heating rates. By using a temperature controller and an ambient temperature of −8° C., sample temperatures between −40 and 100° C. could be reached in a matter of seconds. When maximum TEC cooling conditions were maintained for more than 10 minutes, sample temperatures below −50° C. could be attained.

Example 2

The variable temperature IR spectroscopy sample system of Example 1 were evaluated by measuring infrared spectra while applying temperature step profiles to solid samples.

In this Example, subtle temperature-dependent spectrum changes were observed in a sample of kaolinite (CAS: 1318-74-7) using reproducible linear heating and cooling ramps. Kaolinite was selected because its temperature-dependent structural changes are well known. In particular, the infrared absorbance band wavenumbers for this clay's two types of hydroxyl groups shift in opposite directions when sample temperature is varied.

To test linear heating/cooling temperature ramps, kaolinite powder infrared spectra were measured at approximately 1-minute intervals while cooling a neat sample from 100° C. to −20° C. at a programmed rate of −2° C./min, holding at −20° C. for 5 min, then heating to 100° C. at a programmed rate of +2° C./min.

Thermocouple measurements were made at 0.5-second intervals throughout these sample temperature variations. Temperature-dependent trends in the acquired spectra were consistent with those previously reported spectra for the same material. Because temperature ramps were generated based on thermocouple measurement feedback, button sample holder temperatures consistently lagged setpoint temperatures by 0.1° C. to 0.3° C. during heating and cooling ramps. Cooling and heating rates calculated by linear regressions of temperature versus time measurements were found to be −2.01° C./min and +1.98° C./min, respectively, which were within 1% of the 2° C./min programmed rates.

Example 3

In addition to linear heating ramps, button sample holder temperatures were programmed to follow an increasing temperature step function. The variable temperature IR spectroscopy sample system of Example 1 was evaluated with a stepped heating profile using calcium montmorillonite containing 15% by weight acetylsalicylic acid. Infrared spectra were obtained isothermally when using this stepped heating profile approach.

Button sample holder temperatures were measured at 0.5-second intervals during a step heating and cooling profile employed to study the thermal properties of montmorillonite. This sample was previously studied by thermogravimetry-mass spectrometry and by variable temperature infrared spectroscopy by using a linear heating ramp. Sample temperatures increased by 20° C. per step from 20° C. to 100° C. After a 1-minute isothermal period at 20° C., the temperature was increased to 40° C. at a rate of 1.25° C./s. After a 1.5-minute 40° C. isothermal period, the temperature was returned to 20° C. by cooling at a rate of-1.20° C./s. This cycle was repeated, sequentially heating the sample to 60° C., 80° C., and 100° C. Infrared spectra were collected during the last 30 seconds of each isothermal period, when measured temperature standard deviations were approximately ±0.2° C.

The main differences in the infrared spectra acquired during the first and final 20° C. isothermal periods could be attributed to effects from water loss. Several acetylsalicylic absorption bands remained in the spectrum obtained after heating the sample to 100° C. but were reduced in intensity when compared to the initial 20° C. spectrum. A shift in the C=O stretching vibration band maximum was consistent with the formation of salicylic acid, which is a thermal decomposition product of acetylsalicylic acid. Wavenumber shifts for the other peaks listed in Table 1, which primarily arise from aromatic ring vibrations, were also consistent with salicylic acid formation, suggesting the presence of both acetylsalicylic and salicylic acids at the end of the sample heating program. In summary, predictable results were obtained using the stepped heating profile.

Example 4

Performance of the variable temperature IR spectroscopy sample system of Example 1 was further evaluated for use with volatile liquids.

The button sample holder used for liquid sample measurements had a 1400-mesh stainless-steel mesh disc with 5 mm square openings. Samples (1.5 mL volumes) were loaded onto the button sample holder outside the spectrophotometer and then isothermally positioned at the infrared beam focal point by using a slide mechanism. For volatile liquids, the time elapsed between placing the sample at the infrared beam focal point and the start of data acquisition had a significant impact on measurement reproducibility. Spectral features were noticeably reduced with slightly longer delays. This was likely caused by radiant heating, which evaporated volatile samples more quickly when infrared source radiation was striking the button sample holder surface. Evaporative sample loss was qualitatively monitored by observing absorbance band intensities in successively acquired single beam spectra.

After positioning a 25° C. button sample holder containing 1.5 mL of acetone at the beam focus, the 1740 cm-1 carbonyl stretching vibration band persisted for about 20 seconds in successively measured single beam spectra. When the button sample holder was cooled to −20° C., the acetone carbonyl band remained in spectra for at least 6 minutes. Cooling the button sample holder from 25° C. to 10° C. increased the acetone residence period by more than a factor of 2, allowing sufficient time to obtain reproducible, high quality spectrum measurements. Other volatile liquids (e.g., ethyl acetate, chloroform) exhibited similar evaporation trends.

Example 5

Various tests were performed to observe the performance of a variable temperature IR spectroscopy sample system having two TECs in a stacked configuration. Sample temperatures for these tests were adjusted by controlling the heat transferred between the first (upper) TEC, having dimensions of 30 mm×30 mm×3.46 mm, and the second (lower) TEC, which had dimensions of 40 mm×40 mm×4.09 mm. The first and second TECs were captured, respectively, within a first chamber of a first (upper) aluminum plate and a second chamber of a second (lower) aluminum plate. Silicon adhesive was used to seal the edges of the bottom of the second TEC within the second chamber, thus isolating a coolant reservoir with dimensions of 30 mm×30 mm×2 mm in the second aluminum plate. A continuous flow of a 50:50 water/ethylene glycol mixture was circulated through the coolant reservoir, which held approximately 1.8 mL of liquid coolant, to maintain a 24° C. temperature therein.

A thin layer of thermal paste was applied between the first and second aluminum plates, and a 1.0-inch diameter rubber o-ring seal was sandwiched between the first aluminum plate and a stainless-steel cover plate having a 0.75-inch diameter button aperture punched through its center to receive the button sample holder. The button sample holder for these tests used an aluminum sample plate with a mesh sample retainer recess having a 0.25-inch diameter to accommodate a stainless-steel mesh disc, which was spot welded to a stainless-steel backing member. A Nova Cygni 120 FTIR spectrophotometer and a Praying Mantis™ diffused reflection accessory were again used for infrared spectrum measurements.

The samples were rapidly heated and cooled by adjusting the power delivered to the TEC stack. A driver module with an Accuthermo model ATEC302 temperature controller and FTX700DX H-bridge amplifier was used to provide DC power (12 V, 5 A max) in parallel to the stacked TECs, using the thermocouple voltage as feedback. With the H-bridge amplifier, applied voltage polarity could be reversed, permitting heating and cooling of the upper TEC surface. Using this system, isothermal temperature measurements were constant to within ±0.1° C., and heating rates exceeding 2° C./s could be sustained between 0° C. and 150° C. The driver module was programmed to set temperature controller parameters and to initiate linear heating and cooling ramps. Macro programs were used to generate temperature step and ramp heating and cooling profiles and to trigger interferogram data collections at specified times and temperatures, providing reproducible automated measurements.

A sample of ibuprofen (CAS: 15687-27-1) was used to test the temperature accuracy of this variable temperature IR spectroscopy sample system. First, calibration was conducted to ensure accurate temperature measurements when the button was uniformly heated. By adjusting the temperature controller process variable offset parameter, readings provided by the thermocouple were adjusted to 0° C. and 100° C. when the button sample holder was immersed in an ice water bath and in boiling water, respectively. At equilibrium, repeated measurements were within ±0.3° C. of these reference temperatures.

The sample temperature accuracy was evaluated by measuring infrared spectra while heating ibuprofen powder to its melting point, which is between 70° C. and 80° C. depending on heating rate. While heating the powder from 50° C. to 90° C. at 2.5° C./min, ibuprofen melting was detected at 70.4° C. by differential thermal analysis (DTA). The infrared band wavenumbers and relative intensities were similar to previously reported spectra.

Example 6

A sample of sodium nitrate (CAS: 7631-99-4) was used to perform further testing with the variable temperature IR spectroscopy sample system of Example 5. Specifically, these tests investigated the ability of the variable temperature IR spectroscopy sample system to provide artifact-free spectra by monitoring temperature-dependent spectrum changes for sodium nitrate, which is minimally affected by heating. The anion vibration bands in anhydrous sodium nitrate infrared spectra vary slightly over the 30° C. to 150° C. temperature range. Because temperature-dependent sample changes are minimal, infrared spectrum features attributed to instrument variations are more obvious.

Figure 8:
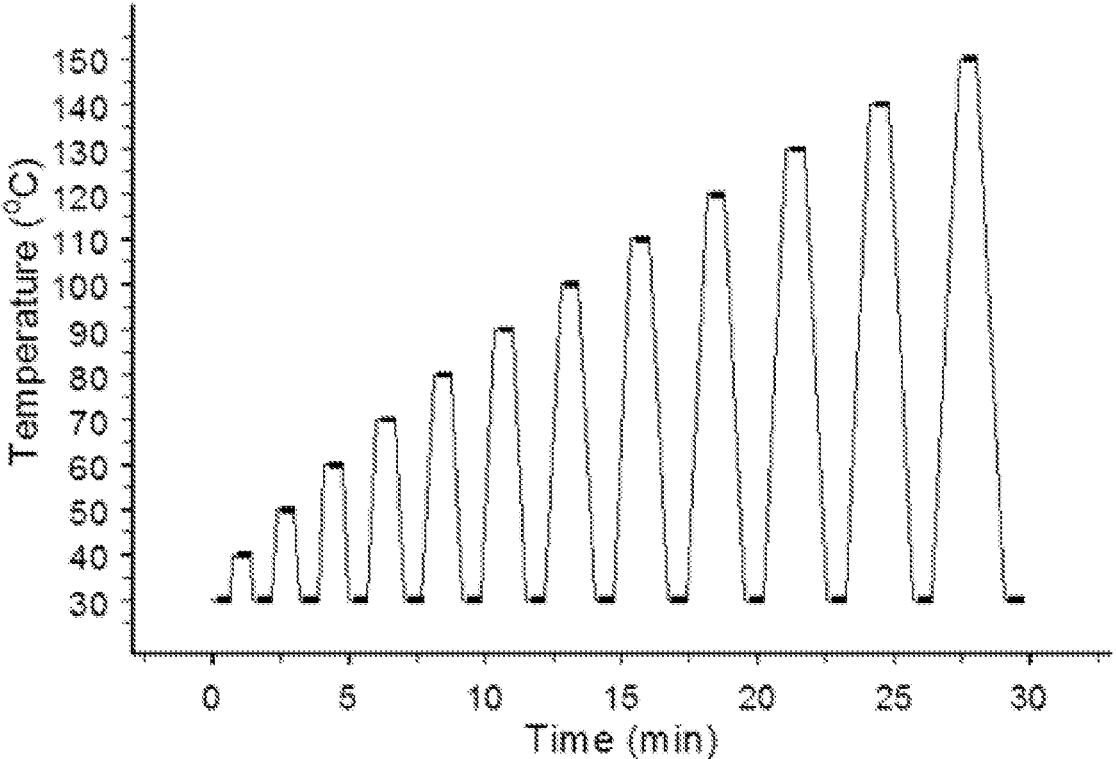
FIG. 8 depicts a heating profile employed by the variable temperature IR spectroscopy sample system in accordance with an exemplary embodiment.

Sodium nitrate powder infrared spectra were acquired at selected temperatures by using the step heating temperature profile depicted in FIG. 8, where thicker line segments denote isothermal spectrum measurement periods. After obtaining a spectrum at 30° C., the sample temperature was increased to 40° C. and another spectrum was measured. The sample was then cooled back to 30° C. and a third spectrum was measured. This procedure was repeated until twelve

(12) spectra were measured at 30° C. and twelve (12) spectra were measured at 10° C. increments between 40° C. and 150° C.

When the 12 spectra obtained isothermally at 30° C. were overlaid, the band shapes were reproducible, with only slight variations in band intensities. These variations were related to instrument measurement reproducibility. In contrast, spectra obtained at elevated temperatures exhibited variations primarily associated with reversible sample changes. The reversible sample changes responsible for these variations were about five times larger than the instrument variations, and these spectral variations were consistent with previously reported trends for sodium nitrate.

Example 7

Calcium sulfate dihydrate (gypsum) (CAS: 10101-41-4) was used to test the performance of the variable temperature IR spectroscopy sample system of Example 5 to detect reversible and irreversible processes. Because the properties of this substance depend heavily on its water content, its dehydration mechanisms under different conditions have been studied extensively. Spectra were obtained by heating neat calcium sulfate dihydrate powder from 30° C. to 150° C. in two-minute isothermal temperature steps of 10° C. Temperatures were returned to 30° C. after each heating step.

The spectrum obtained when the sample temperature was maintained at 30° C. was consistent with previously published spectra of calcium sulfate dihydrate, and the spectrum obtained when a temperature of 150° C. was maintained was representative of anhydrous calcium sulfate. At temperatures below 60° C., changes in the infrared spectra were minimal. After the sample had reached 60° C., the spectra measured at 30° C. indicated that irreversible sample changes had occurred. The integrated band intensities for spectra measured for temperature steps at 100° C. and above were relatively constant, but intensities in spectra obtained after cooling to 30° C. were consistently higher. Sample changes observed when the sample was heated to 150° C. could be attributed to sample dehydration. When the sample was cooled from 150° C. to 30° C., these temperature-dependent changes were reversed due to partial sample re-hydration as the sample was cooled. Contaminant (e.g., water) adsorption during cooling could be circumvented by enclosing the variable temperature IR spectroscopy sample system inside a purged or evacuated chamber. However, the infrared transparent windows that would be required to seal the chamber would diminish optical throughput, reducing measured spectrum signal-to-noise ratios.

Example 8

Lastly, the variable temperature IR spectroscopy sample system of Example 5 was used to characterize the thermal decomposition of a sample of acetylsalicylic acid (CAS: 50-78-2), which was obtained by pulverizing a commercial aspirin tablet containing 81 mg (72% w/w) acetylsalicylic acid. Less than 1 mg of this powder was placed in the button sample holder for analysis.

Infrared spectra were successively measured while heating samples with 2.5° C./min, 5° C./min, and 10° C./min linear temperature ramps from 30° C. to 150° C. Initially, infrared spectra were dominated by acetylsalicylic acid absorbance bands, which is consistent with known spectra for pharmaceuticals containing acetylsalicylic acid. Band locations and shapes in the 30° C. infrared spectrum were consistent with the acetylsalicylic acid dimer. At 120° C., most infrared absorbance was lost due to decomposition of the acetylsalicylic acid active ingredient. Above 120° C., the tablet residue oxidized, yielding a 150° C. spectrum that indicated the presence of C—O stretching, C═O stretching, and O—H stretching functional group vibrations. Decomposition processes were investigated by monitoring acetylsalicylic acid-specific spectral features as a function of temperature. Only infrared spectrum changes at higher temperatures could be correlated with a loss of acetylsalicylic acid (i.e., decomposition). This result may have occurred because tablet fillers, such as starch, are known to inhibit acetylsalicylic acid decomposition, and starch was an ingredient in the commercial aspirin tablet used for this testing.

Thus, the embodiments of the present disclosure are well adapted to carry out the objects and attain the ends and advantages mentioned above, as well as those inherent therein. While the test apparatus has been described and illustrated herein by reference to particular non-limiting embodiments in relation to the drawings attached thereto, various changes and further modifications, apart from those shown or suggested herein, may be made therein by those of ordinary skill in the art, without departing from the spirit of the inventive concepts.

It is claimed:

1. A test sample system for carrying out a testing protocol on a sample at one or more temperatures within a spectrophotometer, the system comprising:
    a button sample holder configured to hold the sample during the testing protocol,
      wherein the button sample holder further comprises:
      a mesh sample retainer, wherein the mesh sample retainer comprises:
        a mesh disc configured to retain the sample;
        a backing member; and
        a thermocouple connected to the backing member and configured to measure the temperature of the sample in the mesh disc; and
      a sample plate, wherein the sample plate comprises a mesh sample container recess that is configured to receive the mesh sample retainer such that a top surface of the mesh disc is substantially flush with a top surface of the sample plate; and
    a temperature control support assembly for supporting the button sample holder and controlling the temperature of the sample in the button sample holder, wherein the temperature control support assembly comprises:
      a thermoelectric heat transfer system comprising at least one thermoelectric chip (TEC) in direct contact with the sample plate of the button sample holder; and
      a liquid cooling system.

2. The test sample system of claim 1, wherein the liquid cooling system comprises a cooling block and wherein the at least one TEC is mounted on the cooling block.

3. The test sample system of claim 2, wherein the liquid cooling system further comprises:
    a recirculating chiller for chilling a coolant liquid;
    an inlet for delivering the coolant liquid from the recirculating chiller to the cooling block; and
    an outlet for delivering the coolant liquid from the cooling block to the recirculating chiller.

4. The test sample system of claim 1, wherein the mesh sample retainer recess has approximately the same diameter as the mesh sample retainer.

5. The test sample system of claim 1, wherein the thermoelectric heat transfer system comprises at least two TECs.

6. A test sample system for carrying out a testing protocol on a sample at one or more temperatures within a spectrophotometer, the system comprising:
    a button sample holder configured to hold the sample during the testing protocol,
      wherein the button sample holder further comprises:
      a mesh sample retainer, wherein the mesh sample retainer comprises:
        a mesh disc configured to retain the sample;
        a backing member; and
        a thermocouple connected to the backing member and configured to measure the temperature of the sample in the mesh disc; and
      a sample plate, wherein the sample plate comprises a mesh sample container recess that is configured to receive the mesh sample retainer such that a top surface of the mesh disc is substantially flush with a top surface of the sample plate; and
    a temperature control support assembly for supporting the button sample holder and controlling the temperature of the sample in the button sample holder, wherein the temperature control support assembly comprises:
      a thermoelectric heat transfer system comprising two or more thermoelectric chips (TECs), wherein at least one of the two or more TECs is in contact with the sample plate of the button sample holder; and
      a liquid cooling system.

7. The test sample system of claim 6, wherein the thermoelectric heat transfer system comprises:
    a first TEC in contact with the button sample holder; and
    a second TEC in planar contact with the first TEC.

8. The test sample system of claim 7, wherein the temperature control support assembly further comprises a housing for retaining the first and second TECs.

9. The test sample system of claim 8, wherein the housing comprises:
    a first plate that includes a first chamber configured to retain the first TEC and an upper portion of the second TEC;
    a second plate that includes a second chamber configured to retain a lower portion of the second TEC; and
    a cover plate connected to the first plate, wherein the cover plate includes a button aperture sized to allow the button sample holder to be placed in direct contact with the first TEC.

10. The test sample system of claim 9, wherein the second plate further comprises a coolant reservoir under the second TEC.

11. The test sample system of claim 9, wherein the housing further comprises an o-ring seal between the cover plate and the first TEC.

12. A method for the variable temperature infrared spectroscopy analysis of a test sample using a spectrophotometer, the method comprising the steps of:
    loading the sample in a button sample holder that includes a mesh sample retainer and sample plate, wherein the mesh sample retainer further includes a mesh disc configured to retain the sample, a backing member, and a thermocouple connected to the backing member and configured to measure the temperature of the sample in the mesh disc, and wherein the sample plate comprises a mesh sample container recess that is configured to receive the mesh sample retainer such that a top surface of the mesh disc is substantially flush with a top surface of the sample plate;
    placing the loaded button sample holder onto a temperature control support assembly that includes a thermoelectric heat transfer system that includes at least one thermoelectric chip (TEC) such that that TEC is in direct contact with the sample plate of the button sample holder;

placing the loaded button sample holder and temperature control support assembly into the spectrophotometer;

changing the temperature of the sample to a setpoint temperature with a thermoelectric chip in the temperature control support assembly; and taking a measurement with the spectrophotometer of the sample at the setpoint temperature.

13. The method of claim 11, further comprising the step of cooling the temperature control support assembly with a liquid cooling system.

14. The method of claim 11, further comprising the steps of:

changing the temperature of the sample to a second setpoint temperature with the thermoelectric chip in the temperature control support assembly; and taking a second measurement with the spectrophotometer of the sample at the second setpoint temperature.

15. The method of claim 14, further comprising the step of selecting the first setpoint temperature and the second setpoint temperature to accomplish measurements for a linear, cyclic, exponential or stepped temperature profile.

* * * * *